(No Model.)
T. R. BUTMAN.
FEED WATER HEATER.
No. 281,014. Patented July 10, 1883.
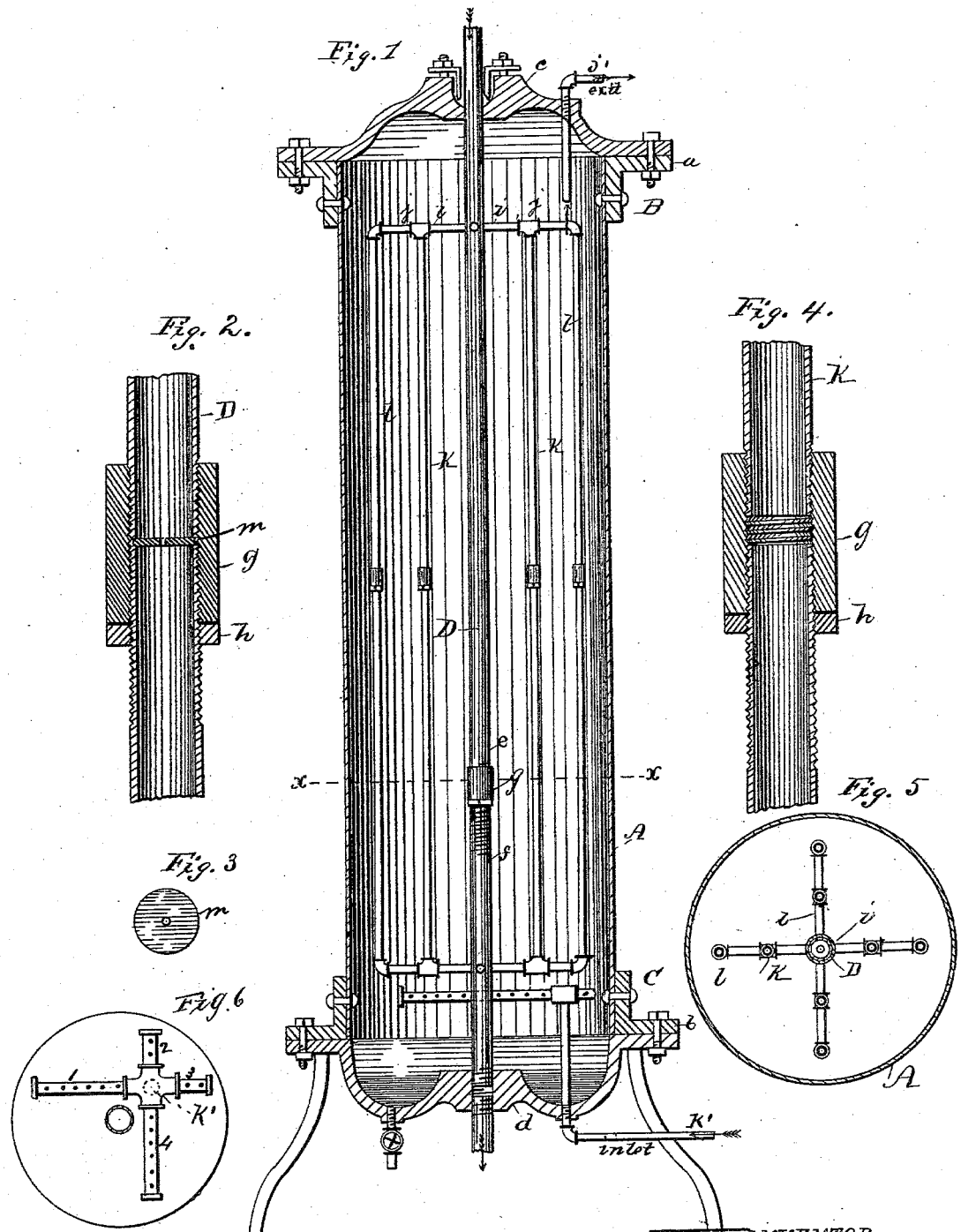
WITNESSES
Chas. R. Burr
W. E. Bowen
INVENTOR,
Thos. R. Butman
per O. C. Duff
Attorney

UNITED STATES PATENT OFFICE.

THOMAS REED BUTMAN, OF CLEVELAND, OHIO.

FEED-WATER HEATER.

SPECIFICATION forming part of Letters Patent No. 281,014, dated July 10, 1883.

Application filed March 9, 1883. (No model.)

*To all whom it may concern:*

Be it known that I, THOMAS REED BUTMAN, of Cleveland, in the county of Cuyahoga and State of Ohio, have invented certain new and useful Improvements in Feed-Water Heaters for Steam-Boilers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to feed-water heaters, and has for its object to prevent the exhaust-steam of the engine, with its impurities—such as oil, grease, and other foreign substances—from coming in contact and mixing with the feed-water of the boiler, and thereby prevent the said impurities from depositing themselves upon the shell thereof. This heater is designed to be simple, durable, and cheap, and is specially adapted for light-power engines and boilers. It is readily accessible for cleaning and repairs.

The invention consists in introducing the exhaust-steam into a central pipe, having within it and located near its middle a disk-plate, which divides it into upper and lower sections, in combination with a series of radial pipes connecting above and below the disk $m$, through which the exhaust-steam passes, and the feed-water, passing around and between these pipes, is heated, and in other details of construction, which will more fully hereinafter appear, and be pointed out in the claims.

Referring to the drawings, Figure 1 represents a central longitudinal sectional elevation properly supported. Fig. 2 shows the central pipe-connection, the screw-thimble, and disk in section, the latter showing an aperture for the passage of the water of condensation from the upper to the lower section. Fig. 3 shows a plan of the disk or diaphragm, and Fig. 4 a section of the radiating-pipe connection and the connecting-thimble and lock-nut. Fig. 5 is a horizontal cross-section on the line $x\ x$ of Fig. 1, showing the arrangement of the central and distributing pipes. Fig. 6 is a plan view of the water-feed device located near the bottom of the heater, having lateral spray-pipes 1 2 3 4, by which the water is finely divided into jets.

In the drawings the same letters denote like parts in all the figures. A is the vessel, which is a simple cylinder, to which is properly secured at each end an annulus, B C, having flanges $a\ b$. To these flanges $a\ b$, I secure bottom and top heads, which are symmetrical in form, being somewhat of a double ogee shape. Each of the heads is made thicker in the middle than elsewhere, as shown by letters $c\ d$, and are for the following purposes, respectively: The top head, $c$, is centrally bored to form a gland, through which is inserted the central exhaust-steam pipe. The gland is of course for the purpose of packing the pipe to prevent leakage. The bottom head is also centrally bored, and is screw-threaded from each side, leaving an unthreaded portion in the center, so that the pipes, when screwed from either side, will fit tightly. The upper head has a water-exit pipe, $j'$, and the lower head an inlet-pipe, $k'$, as well as a blow-off pipe.

Referring now to the construction of the group of steam-condensing pipes in detail, D is the main central exhaust-steam pipe, made in two sections, (shown by $e\ f$.) The lower section, $f$, is screw-threaded sufficiently to permit the coupling-thimble $g$ to be screwed onto it its entire length, so that when the upper section is to be joined to the lower the thimble is screwed back into the screw-threads of the upper section, taking care, however, that the disk is first put in place. This central pipe, D, is preferably larger than the exhaust-pipe of the engine, whereby back-pressure is avoided, and its area is a little less than the combined area of the small or radiating pipes, which are similarly coupled. To prevent the possibility of any leakage from or through the couplings, I provide a lock-nut, $h$, to be screwed on after the thimble-coupling is in place, and between the end of the thimble and said lock-nut I interpose a packing and then screw the lock-nut home, and thus produce a tight joint.

Near the upper end of the vessel A and onto the central pipe, I attach a series of horizontal pipes, $i\ i$, four of which are shown; but the number of the pipes may be increased or diminished, as necessity may require. To these pipes $i\ i$, I attach T-couplings $j\ j$ for one series of pipes, (marked k k,) and at the ends I attach elbow-couplings for another series of pipes, (marked l l.) To the lower section of pipe D are attached pipes and couplings similar to those connected to the upper section. These vertical pipes l and k are preferably coupled in the middle in the same manner as the large pipe D. All these pipe-connections may be coupled by any suitable means, as I do not desire to be confined to any exact methods of coupling.

The operation of my feed-water heater is as follows: The exhaust-steam enters pipe D and fills said pipe to the disk. It then radiates and passes through the group of vertical pipes l k, and again enters the pipe D below the diaphragm and passes off at its lower end to the atmosphere. While the exhaust-steam is taking a circuitous course through the pipes downward the feed-water is traveling in an opposite direction, it being introduced through what is known as a "cross," or other similar means, by which the water is diffused throughout the lower portion of the heater. Thus the volume of water is broken up into fine particles, and, coming in contact with the heat, it in this way more readily separates from its sedimentary substances, and which settle at the bottom of the heater. The water is thus not only heated, but also freed from its impurities. The water and steam moving in opposite directions they exchange their temperatures much more rapidly than if both were traveling in the same direction. The pipe which supports the cross and its radiating perforated pipes, as shown by Fig. 6, extends upward from the bottom, so as not to interfere with sedimentary deposit resting thereon.

Having thus described my invention, what I claim as new, and desire to secure by Letters Patent, is—

1. A feed-water heater consisting of the vessel having the upper and lower heads, said heads being provided with central apertures, in combination with the central pipe having the dividing-disk and the radiating-pipes, as set forth.

2. A feed-water heater consisting of the vessel having upper and lower heads, said heads being re-enforced centrally, and having apertures therein, in combination with the central and radiating pipes, the inlet-pipe being removably fixed in the heads by retaining devices, as set forth.

3. The combination, in a feed-water heater, of the vessel A, having heads provided with sediment-pockets and centrally increased in thickness, whereby the lower head is made to form a "union" and the upper head a stuffing-box, with the central steam-inlet pipe arranged in such manner that the expansion and contraction of the parts are provided for, thereby preserving the joints from overstrain and leakage.

4. A feed-water heater consisting of the vessel A, adapted to be removable from its lower head or base, said head being centrally bored, in combination with the inlet steam-pipe suitably secured therein, and also secured in the upper head by means of a stuffing-box and gland, whereby when access to the inside of the vessel and to the pipe is desired, the bottom flange, b, being unscrewed, the vessel may be raised off, thus leaving the group of pipes standing vertically and secured in position in the lower head, as described.

5. The combination, in a feed-water heater, of the vessel A, having the centrally strengthened and bored head, with the central exhaust-pipe, D, and the distributing and radiating pipes l k, made in sections, and adapted to be joined by the thimble g and lock-nut h, substantially as shown.

In testimony that I claim the foregoing as my own I affix my signature in presence of two witnesses.

THOMAS REED BUTMAN.

Witnesses:
B. F. MORSELL,
EDWARD E. ELLIS.